United States Patent

Auyer et al.

(10) Patent No.: US 11,371,763 B2
(45) Date of Patent: Jun. 28, 2022

(54) THERMOSTATIC EXPANSION VALVES AND METHODS OF CONTROL

(71) Applicant: Carrier Corporation, Jupiter, FL (US)

(72) Inventors: Douglas Auyer, Clay, NY (US); Gilbert B. Hofsdal, Chittenango, NY (US); William C. Silliman, Syracuse, NY (US); Raymond L. Senf, Jr., Central Square, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 721 days.

(21) Appl. No.: 15/746,874

(22) PCT Filed: Aug. 3, 2016

(86) PCT No.: PCT/US2016/045222
§ 371 (c)(1),
(2) Date: Jan. 23, 2018

(87) PCT Pub. No.: WO2017/023958
PCT Pub. Date: Feb. 9, 2017

(65) Prior Publication Data
US 2019/0056161 A1    Feb. 21, 2019

Related U.S. Application Data

(60) Provisional application No. 62/200,242, filed on Aug. 3, 2015.

(51) Int. Cl.
*F25B 49/02*    (2006.01)
*F25B 41/06*    (2006.01)
*F25B 49/00*    (2006.01)

(52) U.S. Cl.
CPC ............ *F25B 49/005* (2013.01); *F25B 49/02* (2013.01); *F25B 49/022* (2013.01);
(Continued)

(58) Field of Classification Search
CPC .................. F25B 49/022; F25B 41/067; F25B 2341/0681; F25B 2400/01; F25B 2500/26;
(Continued)

(56) References Cited

U.S. PATENT DOCUMENTS 2,389,073 A * 11/1945 Newton ................ F25B 49/025
62/226
3,010,288 A * 11/1961 Jacobs ..................... F25B 41/31
62/277
(Continued)

FOREIGN PATENT DOCUMENTS

CN    101307974 A    11/2008
CN    101317050 A    12/2008
(Continued)

OTHER PUBLICATIONS

"Upgrade and service with ease Extend Lifetime with modular design", Thermostatic expansion valves Type TE5-55, Danfoss Ltd., Denham, UK, Sep. 2011; 6 pages.
(Continued)

*Primary Examiner* — Len Tran
*Assistant Examiner* — Kirstin U Oswald
(74) *Attorney, Agent, or Firm* — Cantor Colburn LLP

(57) ABSTRACT

A method of operating a refrigeration system is provided. The method includes activating an evaporator heater (306), monitoring a pressure differential within the refrigeration system (308), when the pressure differential reaches a predetermined value (310), deactivating the evaporator heater (312), and activating one or more evaporator fans (314), after deactivating the evaporator heater, to cause a thermostatic expansion valve to open.

13 Claims, 3 Drawing Sheets

(52) U.S. Cl.
CPC ... *F25B 2341/0681* (2013.01); *F25B 2400/01* (2013.01); *F25B 2500/26* (2013.01); *F25B 2600/0251* (2013.01); *F25B 2600/112* (2013.01); *F25B 2600/2513* (2013.01); *F25B 2700/1931* (2013.01); *F25B 2700/1933* (2013.01); *Y02B 30/70* (2013.01)

(58) Field of Classification Search
CPC ........ F25B 2600/0251; F25B 2600/112; F25B 2600/2513; F25B 2700/1931; F25B 2700/1933; F25B 49/005; F25B 49/02; Y02B 30/743; Y02B 30/70
USPC .......................................................... 62/115
See application file for complete search history.

(56) References Cited

U.S. PATENT DOCUMENTS

| | | | | |
|---|---|---|---|---|
| 3,023,589 | A | * | 3/1962 | Jacobs .................. F25D 21/002 62/186 |
| 3,453,837 | A | * | 7/1969 | Ting ...................... F25D 21/006 62/276 |
| 3,670,808 | A | * | 6/1972 | Wait, Jr. ............. B60H 1/00378 62/428 |
| 3,774,406 | A | * | 11/1973 | Reitblatt .................. F25D 21/14 62/278 |
| 3,992,895 | A | * | 11/1976 | Kramer ................. F25B 47/022 62/155 |
| 4,152,902 | A | * | 5/1979 | Lush ....................... F04C 28/02 62/157 |
| 4,193,781 | A | * | 3/1980 | Vogel ..................... F25B 49/02 62/81 |
| 4,327,556 | A | * | 5/1982 | Zampini ............... F25D 21/006 62/155 |
| 4,332,142 | A | * | 6/1982 | Prada ...................... F25D 21/04 62/275 |
| 4,531,376 | A | * | 7/1985 | Alsenz .................. F25D 21/006 62/155 |
| 4,653,285 | A | * | 3/1987 | Pohl ..................... F25D 21/006 361/33 |
| 4,812,622 | A | * | 3/1989 | Takeda .................. F25D 21/002 392/382 |
| 4,879,879 | A | * | 11/1989 | Marsala .................. F25B 21/04 236/68 B |
| 5,216,897 | A | * | 6/1993 | Tsuchiyama ............ F24F 1/031 62/158 |
| 6,035,651 | A | | 3/2000 | Carey |
| 7,127,905 | B2 | | 10/2006 | Eisenhower et al. |
| 7,958,737 | B2 | | 6/2011 | Lifson et al. |
| 8,191,377 | B2 | | 6/2012 | Aiyama et al. |
| 8,678,786 | B2 | | 3/2014 | Tang et al. |
| 8,696,335 | B2 | | 4/2014 | Fujimoto et al. |
| 8,776,541 | B2 | | 7/2014 | Steele et al. |
| 8,984,901 | B2 | | 3/2015 | Honda |
| 2009/0044550 | A1 | | 2/2009 | Nishimura et al. |
| 2011/0113797 | A1 | | 5/2011 | Peyaud et al. |
| 2012/0000223 | A1 | | 1/2012 | Kinoshita et al. |
| 2012/0102779 | A1 | | 5/2012 | Beers |
| 2013/0213084 | A1 | | 8/2013 | Takizawa et al. |
| 2013/0227978 | A1 | | 9/2013 | Kawai et al. |
| 2013/0291573 | A1 | | 11/2013 | Favero |
| 2013/0312438 | A1 | | 11/2013 | Kudo et al. |
| 2014/0331694 | A1 | | 11/2014 | Fraser et al. |
| 2015/0052923 | A1 | | 2/2015 | Kanazawa et al. |
| 2015/0059377 | A1 | | 3/2015 | Kanazawa et al. |
| 2015/0096621 | A1 | | 4/2015 | Perez et al. |
| 2015/0168042 | A1 | | 6/2015 | Goel et al. |

FOREIGN PATENT DOCUMENTS

| | | | |
|---|---|---|---|
| CN | 102494445 | A | 6/2012 |
| CN | 104197465 | A | 12/2014 |
| DE | 102005057149 | A1 | 6/2007 |
| DE | 102013014543 | A1 | 3/2015 |
| EP | 2873936 | A2 | 5/2015 |
| JP | H02202370 | A * | 8/1990 |
| JP | H02202370 | A * | 10/1990 |
| JP | 611208 | A | 1/1994 |
| JP | 9277820 | A | 10/1997 |
| JP | 2009138980 | A | 6/2009 |
| JP | 2010096408 | A | 4/2010 |
| JP | 2015052438 | A | 3/2015 |
| KR | 20090021603 | A | 3/2009 |
| WO | 2010146010 | A1 | 12/2010 |
| WO | 2011056371 | A2 | 5/2011 |
| WO | 2015060384 | A1 | 4/2015 |

OTHER PUBLICATIONS

International Search Report and Written Opinion, International Application No. PCT/US2016/045222, dated Oct. 21, 2016, European Patent Office; International Search Report 6 pages, Written Opinion 4 pages.

Chinese Office Action With English Translation for Application No. 201680045535.8; dated Dec. 3, 2019. 9 Pages.

* cited by examiner

THERMOSTATIC EXPANSION VALVES AND METHODS OF CONTROL

CROSS REFERENCE TO RELATED APPLICATIONS

This is a U.S. National Stage of Application No. PCT/US2016/045222, filed on Aug. 3, 2016, which claims the benefit of U.S. Provisional Patent Application No. 62/200,242, filed on Aug. 3, 2015, the disclosures of which are incorporated herein by reference.

BACKGROUND

The subject matter disclosed herein generally relates to thermostatic expansion valves and, more particularly, to control and operation of thermostatic expansion valves in refrigeration systems.

In a typical refrigeration system, high pressure liquid refrigerant is expanded in an expansion valve incorporated in a liquid refrigerant line between a condenser and an evaporator. The low pressure, low temperature refrigerant discharged from the expansion valve is then directed through the evaporator for absorbing heat and thus refrigerating the space surrounding the evaporator. The expansion valve is adjusted to control the refrigerant flowing into the evaporator to a rate sufficient to maintain a desired temperature of the evaporator. More specifically, a thermostatic expansion valve meters the flow of refrigerant into the evaporator in proportion to the rate of evaporation of the refrigerant in the evaporator, and is responsive to the temperature of the refrigerant leaving the evaporator and to the pressure in the evaporator. In this manner, a thermostatic expansion valve can control the refrigerant leaving the evaporator at a predetermined superheat.

Generally, the superheat of the refrigerant is a measure of the heat contained in the refrigerant vapor above its heat content at the boiling point (saturation temperature) at the existing pressure (i.e., the heat content of the refrigerant vapor exiting the evaporator coil which is in excess of the heat content of the vapor which normally could be expected at the refrigerant pressure as it exits the evaporator). By ensuring that the condition of the refrigerant entering a suction line from the evaporator (i.e., evaporator outlet) is at a desired superheat level, the performance of the refrigeration system can be efficient and the return of liquid to a compressor may be prevented.

A thermostatic expansion valve typically includes a spring-biased metering valve which regulates the flow of liquid refrigerant through the expansion port to the evaporator. A thermostatic bulb charged with a volatile substance is positioned in heat exchange relation with the suction line of the refrigeration system at the outlet of the evaporator. The thermostatic bulb is interconnected by means of a capillary tube to a diaphragm actuator included on the thermostatic expansion valve with the diaphragm actuator being mechanically interconnected to the metering valve of the thermostatic expansion valve. A rise in the evaporator temperature will increase the temperature of the evaporated gas passing through the suction line (i.e., increase its superheat) which in turn is sensed by the thermostatic bulb. The thermostatic bulb absorbs heat and the volatile substance therein increases its pressure and thus causes the diaphragm actuator to open the metering valve of the expansion valve and to thus proportionately increase the flow of refrigerant. Upon cooling of the evaporator, the temperature of the refrigerant discharged from the evaporator will decrease which in turn is sensed by the thermostatic bulb thereby resulting in the metering valve of the thermostatic expansion valve to at least partially close and to block at least a portion of the refrigerant flowing to the evaporator.

SUMMARY

According to one embodiment a method of operating a refrigeration system is provided. The method includes activating an evaporator heater, monitoring a pressure differential within the refrigeration system, when the pressure differential reaches a predetermined value, deactivating the evaporator heater, and activating one or more evaporator fans, after deactivating the evaporator heater, to cause a thermostatic expansion valve to open.

In addition to one or more of the features described above, or as an alternative, further embodiments may include that the pressure differential is monitored between an input side and an output side of an evaporator.

In addition to one or more of the features described above, or as an alternative, further embodiments may include that the predetermined value is 50 psi.

In addition to one or more of the features described above, or as an alternative, further embodiments may include determining that the refrigeration system failed to start prior to activating the evaporator heater.

In addition to one or more of the features described above, or as an alternative, further embodiments may include that determining that the refrigeration system failed to start is based on a detected current draw of a compressor.

In addition to one or more of the features described above, or as an alternative, further embodiments may include starting a compressor of the refrigeration system after the thermostatic expansion valve is open.

In addition to one or more of the features described above, or as an alternative, further embodiments may include, after starting the compressor, starting a condenser and then starting an evaporator.

In addition to one or more of the features described above, or as an alternative, further embodiments may include activating one or more condenser fans after activating the evaporator heater.

In addition to one or more of the features described above, or as an alternative, further embodiments may include, when the pressure differential reaches the predetermined value, deactivating the one or more condenser fans.

In accordance with another embodiment, a refrigeration system includes a compressor, a condenser having one or more condenser fans, an evaporator having an evaporator heater and one or more evaporator fans, a thermostatic expansion valve, a fluid path fluidly connecting the compressor, the condenser, the evaporator, and the thermostatic expansion valve, and a controller. The controller is configured to activate the evaporator heater, monitor a pressure differential within the fluid path, when the pressure differential reaches a predetermined value, deactivate the evaporator heater, and activate the one or more evaporator fans to cause the thermostatic expansion valve to open.

In addition to one or more of the features described above, or as an alternative, further embodiments of the refrigeration system may include that the controller is configured to determine that the compressor failed to start prior to activating the evaporator heater.

In addition to one or more of the features described above, or as an alternative, further embodiments of the refrigeration system may include that the controller monitors a current draw of the compressor to determine the compressor failed to start.

In addition to one or more of the features described above, or as an alternative, further embodiments of the refrigeration system may include that the controller is configured to perform a start attempt of the compressor after the thermostatic expansion valve is opened.

In addition to one or more of the features described above, or as an alternative, further embodiments of the refrigeration system may include that the controller is further configured to, after starting the compressor, start the condenser and then start the evaporator.

In addition to one or more of the features described above, or as an alternative, further embodiments of the refrigeration system may include that the controller is configured to activate the one or more condenser fans after activating the evaporator heater.

In addition to one or more of the features described above, or as an alternative, further embodiments of the refrigeration system may include that the controller is configured to, when the pressure differential reaches the predetermined value, deactivate the one or more condenser fans.

In addition to one or more of the features described above, or as an alternative, further embodiments of the refrigeration system may include that the pressure differential is monitored between an input side and an output side of the evaporator.

In addition to one or more of the features described above, or as an alternative, further embodiments of the refrigeration system may include that the predetermined value is 50 psi.

In addition to one or more of the features described above, or as an alternative, further embodiments of the refrigeration system may include at least one sensor configured to sense a pressure differential within the fluid path.

According to another embodiment, a method of operating a refrigeration system is provided. The method includes determining that the refrigeration system failed to start, increasing a temperature at a bulb of a thermostatic expansion valve system within the refrigeration system, increasing a suction pressure at an inlet side of an evaporator in the refrigeration system, opening a thermostatic expansion valve, and starting a compressor of the refrigeration system.

In addition to one or more of the features described above, or as an alternative, further embodiments may include that increasing the temperature comprises activating an evaporator heater.

In addition to one or more of the features described above, or as an alternative, further embodiments may include that increasing the suction pressure comprises activating one or more condenser fans.

In addition to one or more of the features described above, or as an alternative, further embodiments may include monitoring a pressure differential within the refrigeration system and when the pressure differential reaches a predetermined value, activating one or more evaporator fans to cause the thermostatic expansion valve to open.

In addition to one or more of the features described above, or as an alternative, further embodiments may include that the pressure differential is monitored between an input side and an output side of the evaporator.

In addition to one or more of the features described above, or as an alternative, further embodiments may include that the predetermined value is 50 psi.

In addition to one or more of the features described above, or as an alternative, further embodiments may include that determining that the refrigeration system failed to start is based on a detected current draw of the compressor.

In addition to one or more of the features described above, or as an alternative, further embodiments may include, after starting the compressor, starting a condenser and then starting the evaporator.

Technical effects of embodiments of the present disclosure include an refrigeration system having a thermostatic expansion valve that may be electro mechanically manipulated such that the refrigeration system may easily be restarted after shut-down.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
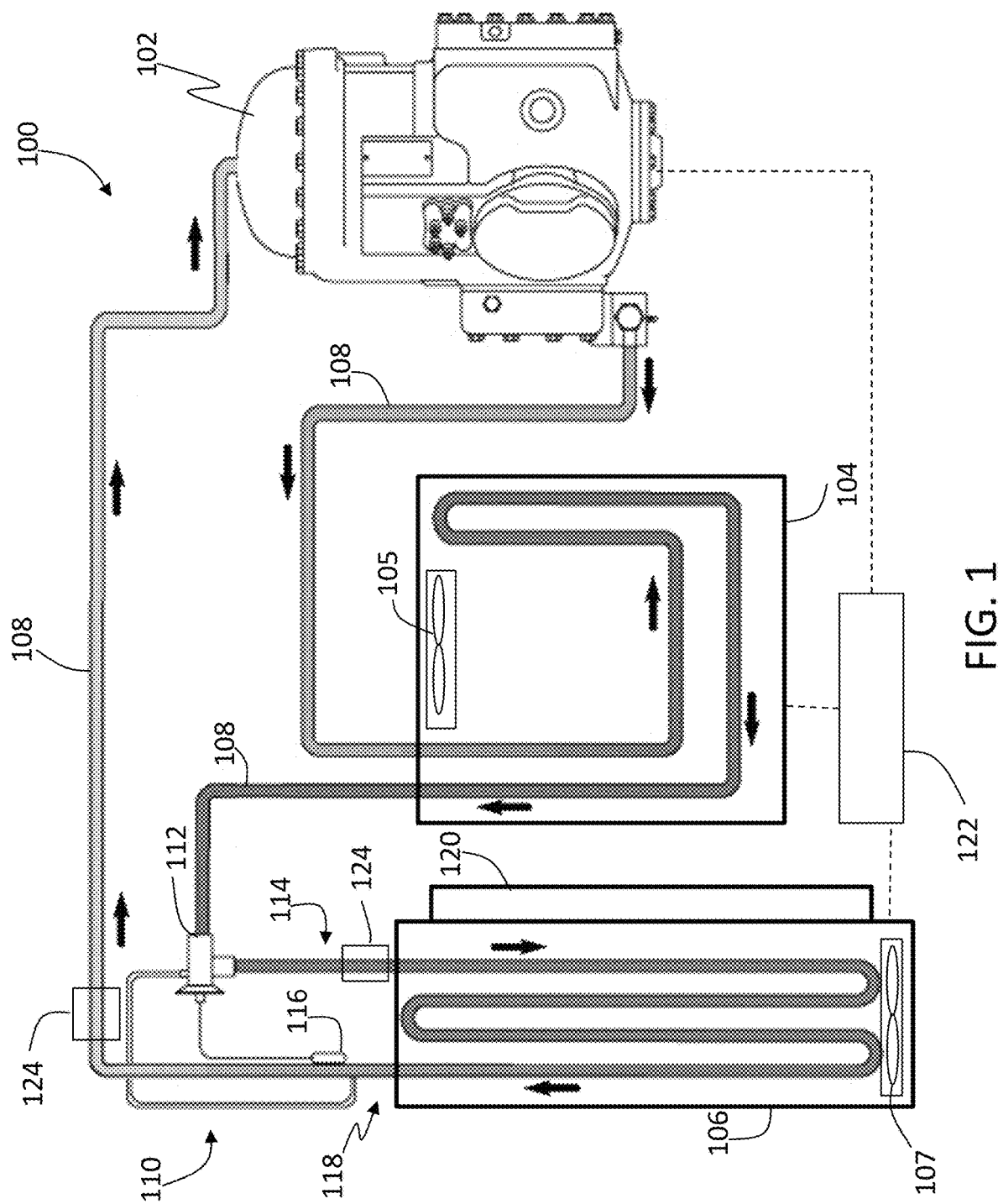
FIG. 1 is a schematic illustration of an refrigeration system in accordance with an example embodiment of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a schematic illustration of a refrigeration system in accordance with an example embodiment. The refrigeration system 100 includes a compressor 102, a condenser 104, and an evaporator 106 that are fluidly connected by a flow path 108. Located between the condenser 104 and the evaporator 106 is a thermostatic expansion valve assembly 110. Flow of a fluid in the flow path 108, such as a coolant or refrigerant, may be controlled by the thermostatic expansion valve assembly 110. The condenser 104 and the evaporator 106 may include one or more fans 105, 107, respectively. In some embodiments the fans 107 of the evaporator 106 may be high speed fans.

The thermostatic expansion valve assembly 110 includes a valve 112 at an input side 114 of the evaporator 106 along the flow path 108. The thermostatic expansion valve assembly 110 also includes a sensor bulb 116 at an output side 118 of the evaporator 106 along the flow path 108. The valve 112 meters flow of the fluid to the evaporator 106 based on a temperature of the fluid that has passed through the evaporator 106, as sensed by the sensor bulb 116. For example, if the fluid sensed by the sensor bulb 116 is above a predetermined temperature, then the valve 112 will be opened to permit fluid to pass through the evaporator 106, thereby cooling the evaporator 106. If the fluid is sensed to be below the predetermined temperature, the valve 112 will close to prevent the evaporator 106 from becoming over cooled. Additionally, as shown in FIG. 1, an evaporator heater 120 may be thermally connected to the evaporator 106 and configured to prevent overcooling of the evaporator 106.

Because of the temperature comparison, and dependency, of the thermostatic expansion valve assembly 110, there may be situations where the valve 112 may not open when it is desired to be opened. For example, during use the valve 112 may be closed, in order to prevent overcooling of the refrigeration system. However, when the refrigeration system 100 is shut down after use, the valve 112 may remain closed. When the valve is closed, the pressure in the refrigeration system 100 may not be able to equalize. Then, when the refrigeration system 100 is attempted to be restarted, due to the high pressure, the compressor 102 may draw a high current to operate. This may cause a safety feature to activate, thus preventing the refrigeration system 100 from starting.

Those of skill in the art will appreciate that the schematic and configuration shown in FIG. 1 is merely an example and other components or configurations are possible. For example, refrigeration systems may include controllers 122, receivers, filters, dryers, additional valves, heat exchangers, sensors 124, indicators, etc. without departing from the scope of the present disclosure.

Embodiments of the present disclosure are configured to enable starting of a refrigeration system, even when the pressure within the system is unequal across a thermostatic expansion valve assembly. In some embodiments, the evaporator heaters are utilized to raise the saturation temperature in the evaporator coil above a return air temperature. Then, turning on the evaporator fans after the heat is removed, the saturation pressure is lowered quickly and the thermal bulb temperature of the thermostatic expansion valve assembly remains warm, creating a sensed high superheat causing the valve of the thermostatic expansion valve assembly to open. When the valve opens, the discharge pressure is lowered by flowing refrigerant back into the evaporator and reducing the differential pressure. Thus, the refrigeration system may be started without pulling too much current.

Figure 2:
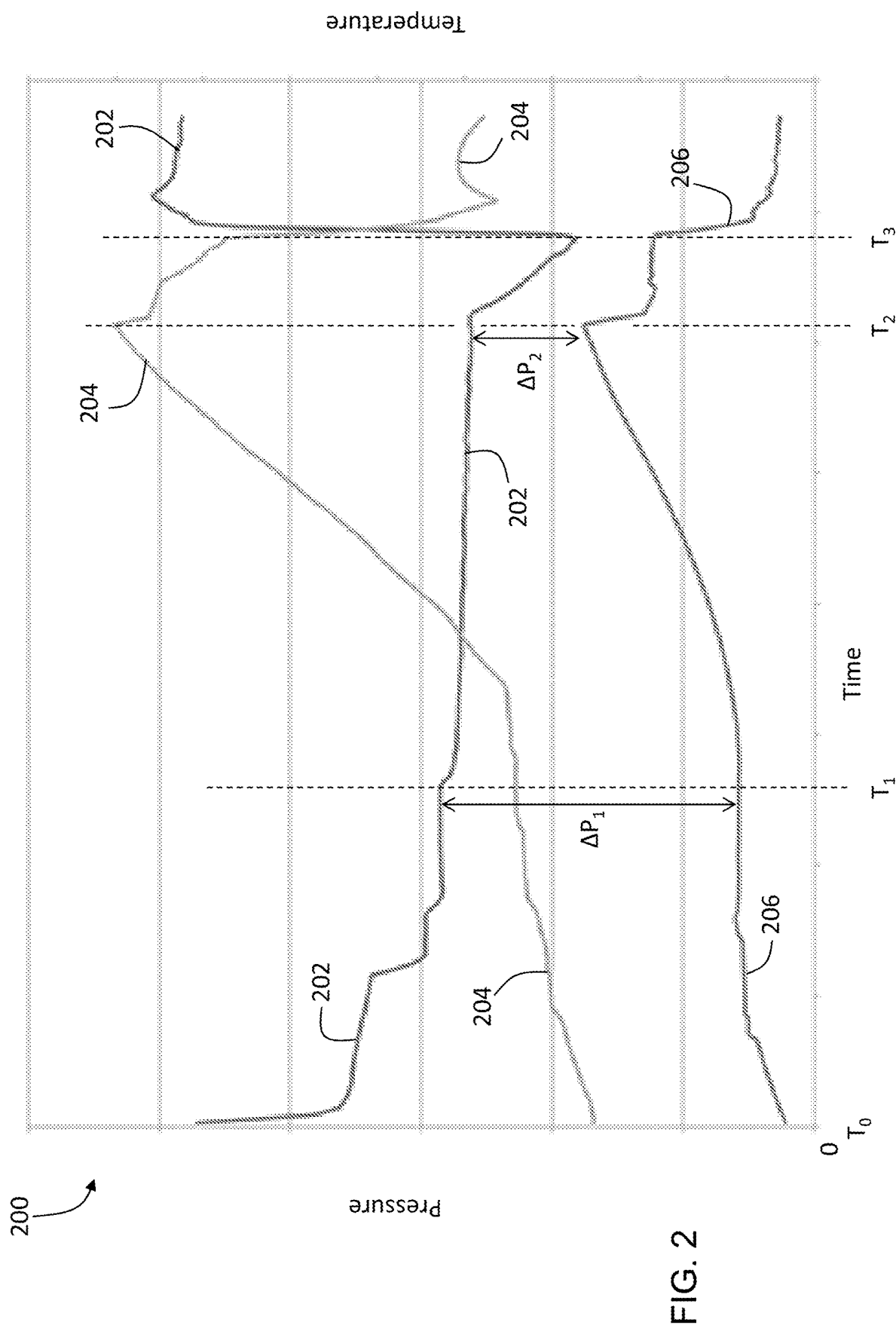
FIG. 2 is a plot schematic of pressure, temperature, and time of a system in accordance with an example embodiment of the present disclosure.

Turning to FIG. 2, a temperature-pressure-time plot is shown. On this plot, pressure is shown on the left vertical axis, temperature is shown in the right vertical axis, and time progresses from time zero and increases to the right in FIG. 2. The plot 200 represents a time period beginning at $T_0$ when a compressor of a refrigeration system is attempted to be started, but fails to start. Such a situation may occur when a pressure differential in the system is too high to enable the valve of a thermostatic expansion valve assembly to open. In accordance with the shown example in FIG. 2 the process is an example of automatically starting the refrigeration system after a failed start. For example, the process described with respect to FIG. 2 may be performed on a system similar to that shown in FIG. 1.

In FIG. 2, line 202 represents the discharge pressure or the pressure of a fluid at the outlet of the evaporator over time (e.g., at output side 118 of FIG. 1). For example, this may be the pressure at the bulb. Line 204 represents the temperature at the bulb over time (e.g., at bulb 116 of FIG. 1). Line 206 represents the suction pressure or the pressure at the inlet to the evaporator (e.g., at input side 114 of FIG. 1).

As noted above, at $T_0$ the compressor of a refrigeration system is attempted to be started, but fails to start. Then, at time $T_1$ the evaporator heat (e.g., evaporator heater 120 of FIG. 1) is turned on. Additionally, at time $T_1$ the fans of the condenser are turned on. As shown in FIG. 2, at time $T_1$ a pressure differential $\Delta P_1$ between the discharge pressure 202 and the suction pressure 206 is present.

Between time $T_1$ and time $T_2$ the suction pressure 206 may increase, the discharge pressure may decrease slightly and/or plateau and the temperature at the bulb may significantly increase. The temperature increase in the bulb may be a result of the operation of the fans and the heaters. For example, the heaters may heat the temperature of a fluid within the evaporator and the condenser fans may blow or more the heated air through the evaporator and toward the bulb. Accordingly, the saturation temperature in the evaporator may be raised above the return air temperature, i.e., at the outlet.

At time $T_2$ a critical pressure differential is created. For example, at time $T_2$, a pressure differential $\Delta P_2$ may be present between the discharge pressure 202 and the suction pressure 206. As shown, the differential pressure $\Delta P_2$ is less than the differential pressure $\Delta P_1$ at time $T_1$. When the differential pressure, e.g. differential pressure $\Delta P_2$, reaches a predetermined pressure differential, the evaporator heater and the condenser fans are turned off. In some embodiments the predetermined pressure differential may be 50 psi, although the pressure differential may be set at any value depending on the needs of the system. At the same time, the evaporator fans are turned on. Further, at time $T_2$, the bulb temperature 204 is much higher than the return air temperature.

After the heater and condenser fans are turned off and the evaporator fan is turned on, the saturation pressure is lowered quickly while the bulb temperature remains warm. This results in a sensed high superheat that causes the thermostatic expansion valve to open at time $T_2$. The opening lowers the discharge pressure 202, as shown after time $T_2$, by flowing fluid back into the evaporator and keeping the differently pressure low (for example, at or below the predetermined differential pressure $\Delta P_2$). With the thermostatic expansion valve open, the compressor of the refrigeration system may be started easily at time $T_3$.

Figure 3:
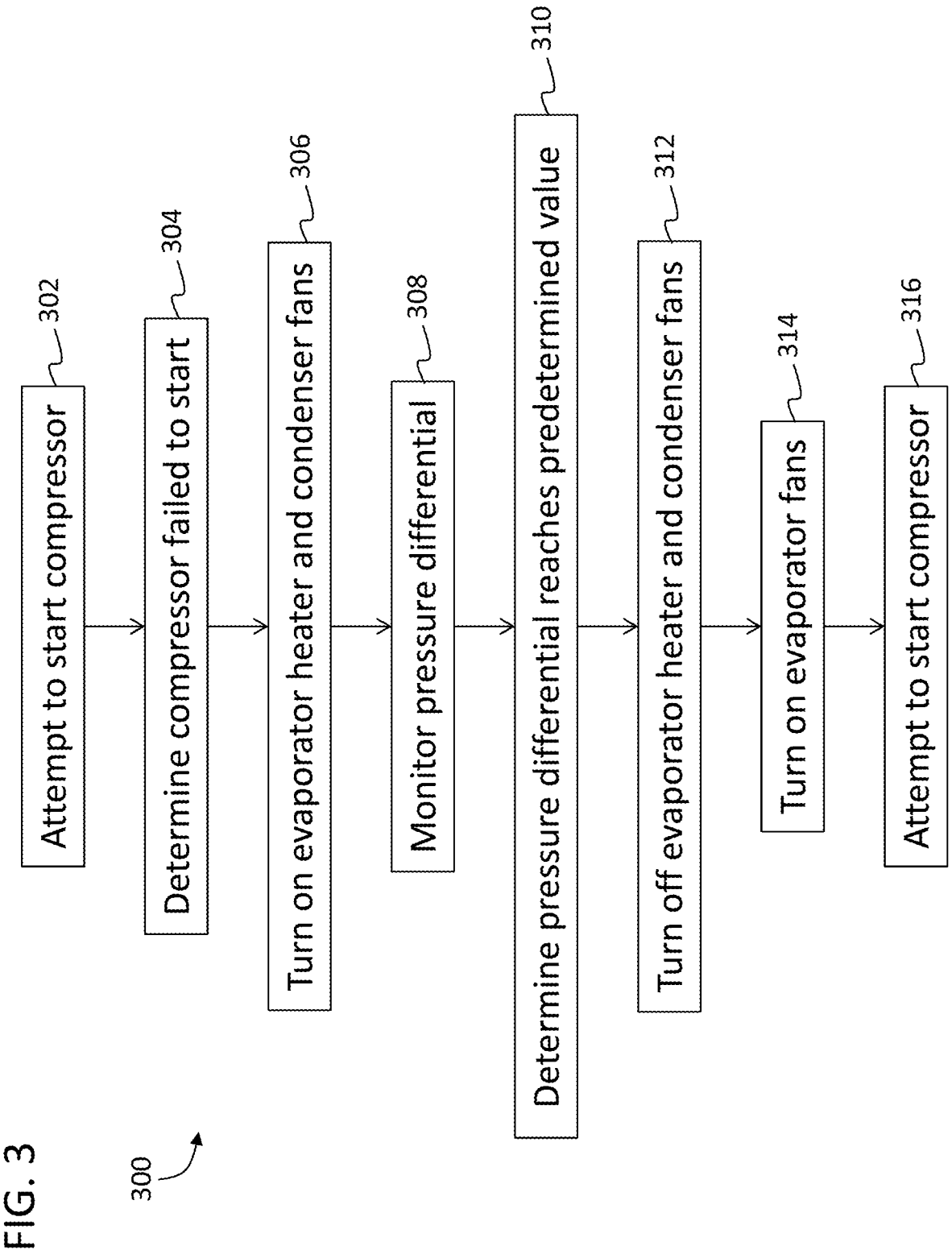
FIG. 3 is a process of operating a refrigeration unit in accordance with an example embodiment of the present disclosure.

Turning now to FIG. 3, a process 300 in accordance with the present disclosure is shown. Process 300 may be similar to the process described with respect to FIG. 2 and may be performed with a refrigeration system similar to the shown in FIG. 1 or variations thereof.

The process begins when a compressor is attempted to be started, but fails to start (step 302). As described above, this may occur when attempting to restart the compressor after shutdown, and the pressure differential within the system causes a valve of a thermostatic expansion valve assembly is closed and cannot be opened. It will be appreciated by those of skill in the art that this situation may arise, for certain systems, during a period after shutdown of the compressor. The period may be, in some examples, twelve hours or less, and in some other systems it may be six hours or less. This time period is a result of the natural equilibrium that is obtained over time after a shut down. However, if the system is attempted to be activated within this time period, the pressure remaining in the system may prevent the valve from opening and thus prevent the compressor from starting.

A determination is made that the compressor failed to start (step 304). To determine if the system failed to start, the current drawn by the compressor may be monitored. If a predetermined current is exceeded by the draw of the compressor, it may be indicated that an attempt was made but the compressor failed to start. As such, a current draw at the time of startup that exceeds a predetermined level may trigger the remaining steps of process 300.

When it is determined that the compressor failed to start upon initiation, a thermostatic expansion valve of the refrigeration system may be manipulated. For example, to force the thermostatic expansion valve to open, a heater of an evaporator and fans of a condenser may be turned on (step 306). This process may heat up the temperature near a bulb of the thermostatic expansion valve assembly, and may further alter the pressure differential across the evaporator. As the components of step 306 are run, the pressure differential across the evaporator may be monitored (step 308).

When it is determined that the pressure differential reaches a predetermined value (step 310), the evaporator heater and the condenser fans may be turned off (step 312). In some embodiments, the pressure differential may be monitored until a 50 psi differential exists.

Alternatively, at steps 308/310, rather than monitor a pressure differential, a predetermined amount of time may elapse. That is, when the evaporator heater and condenser fans (step 306) are operated for a predetermined amount of time, the components may automatically shut off (alternative step 312)

At the same time, or shortly after step 312, the evaporator fans may be turned on (step 314). As a result, the bulb of the thermostatic expansion valve assembly may sense a high superheat which causes the thermostatic expansion valve to open. A starting attempt may be repeated (step 316). If the starting attempt fails (step 316), the process may return to steps 302/304.

After the compressor is started (step 316) additional steps may be performed as part of process 300. For example, after the compressor is started, the condenser may then be activated, and then the evaporator may be activated. In some embodiments, the staggered or staged start up may have each component start-up separated by a predetermined amount of time.

As will be appreciated by those of skill in the art, a controller may be configured with a refrigeration system to perform process 300, as detailed above. That is, in FIG. 1, the refrigeration system 100 may include a processor or other control device, as known in the art, to control the system. The controller may be configured as part of the compressor 102, part of the condenser 104, and/or part of the evaporator 106, or may be separate from the components of the refrigeration system 100, but in communication therewith.

Such controller may be in communication with one or more sensors or other devices that may enable the process to be performed. Such controller system is known in the art and is not shown or further described herein. However, it will be appreciated that the controller system may be configured to perform the steps of process 300 and/or carry out the process described with respect to FIG. 2, and/or variations thereof.

Advantageously, embodiments described herein provide a refrigeration system that is configured to easily restart after a failed starting attempt. Further, advantageously, embodiments disclosed herein allow for an electromechanical manipulation of the thermostatic expansion valve to equalize system pressure. Further, advantageously, embodiments disclosed herein may reduce the amount of current required to start the compressor after a failed start attempt. Further, advantageously, embodiments disclosed herein may enable equalization of the pressure ratio across a compressor and lower the condenser pressure to give the compressor the opportunity to start under a lighter load.

Further, advantageously, those of skill in the art will appreciate that the systems, methods, and processes may be used for other purposes. For example, the systems, methods, and processes described herein may be used to improve compressor reliability. For example, the pressure within the system, e.g., the delta pressure, may be lowered across compressor for each start of the compressor, for the life-time of the compressor, or for some other period or other specified start times. As such, the embodiments described herein are not required to be used for failed starts, but may be used to control the pressure differential within the system for any desired purpose.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although only one simple configuration of a refrigeration system is shown and described, those of skill in the art will appreciate that other components and/or features may be added to the system without departing from the scope of the disclosure. Further, configurations of the components may be used without departing from the scope of the disclosure. Moreover, although described in a specific order of steps and/or timeliness, those of skill in the art will appreciate that these are merely examples, and the process may be varied depending on the needs and configurations that employ the process.

Accordingly, the present disclosure is not to be seen as limited by the foregoing description, but is only limited by the scope of the appended claims.

What is claimed is:

1. A method of operating a refrigeration system comprising:
   determining that the refrigeration system failed to start prior to activating an evaporator heater based on a detected current draw of a compressor, wherein a failed start is based on a current draw of the compressor exceeding a predetermined current;
   activating the evaporator heater;
   monitoring a pressure differential within the refrigeration system;
   when the pressure differential reaches a predetermined value, deactivating the evaporator heater;
   activating one or more evaporator fans, after deactivating the evaporator heater, to cause a thermostatic expansion valve to open; and
   restarting the refrigeration system.

2. The method of claim 1, wherein the pressure differential is monitored between an input side and an output side of an evaporator.

3. The method of claim 1, wherein the predetermined value is 50 psi.

4. The method of claim 1, further comprising starting the compressor of the refrigeration system after the thermostatic expansion valve is open.

5. The method of claim 4, further comprising, after starting the compressor, starting a condenser and then starting an evaporator.

6. The method of claim 1, further comprising activating one or more condenser fans after activating the evaporator heater.

7. The method of claim 6, further comprising, when the pressure differential reaches the predetermined value, deactivating the one or more condenser fans.

8. A refrigeration system comprising:
a compressor;
a condenser having one or more condenser fans;
an evaporator having an evaporator heater and one or more evaporator fans;
a thermostatic expansion valve;
a fluid path fluidly connecting the compressor, the condenser, the evaporator, and the thermostatic expansion valve; and
a controller configured to:
determine that the refrigeration system failed to start prior to activating the evaporator heater based on a detected current draw of the compressor, wherein a failed start is based on a current draw of the compressor exceeding a predetermined current;
activate the evaporator heater;
monitor a pressure differential within the fluid path;
when the pressure differential reaches a predetermined value, deactivate the evaporator heater;
activate the one or more evaporator fans to cause the thermostatic expansion valve to open, and
restart the refrigeration system.

9. The system of claim 8, wherein the controller is further configured to, after starting the compressor, start the condenser and then start the evaporator.

10. The system of claim 8, wherein the controller is configured to activate the one or more condenser fans after activating the evaporator heater.

11. The system of claim 10, wherein the controller is configured to, when the pressure differential reaches the predetermined value, deactivate the one or more condenser fans.

12. The system of claim 8, further comprising at least one sensor configured to sense a pressure differential within the fluid path.

13. A method of operating a refrigeration system comprising:
determining that the refrigeration system failed to start based on a detected current draw of a compressor, wherein a failed start is based on a current draw of the compressor exceeding a predetermined current;
increasing a temperature at a bulb of a thermostatic expansion valve system within the refrigeration system;
increasing a suction pressure at an inlet side of an evaporator in the refrigeration system;
monitoring a pressure differential within the refrigeration system and when the pressure differential reaches a predetermined value, activating one or more evaporator fans to open a thermostatic expansion valve;
restarting the refrigeration system; and
starting the compressor of the refrigeration system.

* * * * *